(12) United States Patent
Beringer et al.

(10) Patent No.: US 7,849,175 B2
(45) Date of Patent: Dec. 7, 2010

(54) CONTROL CENTER PAGES

(75) Inventors: Joerg Beringer, Frankfurt (DE); Michael Hatscher, Osnabrück (DE); Sandra Nieves, Karlsruhe (DE); Annette Häußler, Heidelberg (DE); Edmund Eberleh, St. Leon-Rot (DE); Eric Wood, Menlo Park, CA (US); Emil Tso, Palo Alto, CA (US); Chinhao Lee, Mountain View, CA (US); Matthias Harbusch, Bad Schönborn (DE)

(73) Assignee: SAP AG, Walldorf (DE)

( * ) Notice: Subject to any disclaimer, the term of this patent is extended or adjusted under 35 U.S.C. 154(b) by 1117 days.

(21) Appl. No.: 10/663,382

(22) Filed: Sep. 15, 2003

(65) Prior Publication Data

US 2004/0131050 A1    Jul. 8, 2004

Related U.S. Application Data

(60) Provisional application No. 60/436,219, filed on Dec. 23, 2002, provisional application No. 60/471,389, filed on May 16, 2003.

(51) Int. Cl.
*G06F 15/16* (2006.01)

(52) U.S. Cl. ............... 709/223; 709/201; 709/203; 709/225; 709/236

(58) Field of Classification Search ............... 709/201, 709/203, 223, 225, 236
See application file for complete search history.

(56) References Cited

U.S. PATENT DOCUMENTS

| | | | |
|---|---|---|---|
| 5,634,127 A | 5/1997 | Cloud et al. | |
| 5,721,906 A | 2/1998 | Siefert | |
| 5,802,499 A | 9/1998 | Sampson et al. | |
| 5,826,239 A | 10/1998 | Du et al. | |
| 5,870,545 A | 2/1999 | Davis et al. | |
| 5,893,074 A | 4/1999 | Hughes et al. | |
| 5,899,979 A | 5/1999 | Miller et al. | |
| 6,003,011 A | 12/1999 | Sarin et al. | |
| 6,052,684 A | 4/2000 | Du | |
| 6,078,982 A | 6/2000 | Du et al. | |
| 6,189,003 B1 | 2/2001 | Leal | |
| 6,233,600 B1 | 5/2001 | Salas et al. | |
| 6,278,977 B1 | 8/2001 | Agrawal et al. | |
| 6,297,819 B1 * | 10/2001 | Furst | 715/733 |
| 6,327,628 B1 * | 12/2001 | Anuff et al. | 719/311 |
| 6,473,751 B1 | 10/2002 | Nikolovska et al. | |
| 6,484,149 B1 | 11/2002 | Jammes et al. | |
| 6,636,837 B1 | 10/2003 | Nardozzi et al. | |

(Continued)

OTHER PUBLICATIONS

U.S. Appl. No. 10/628,824, filed Jul. 28, 2003, entitled "Personal Procedure Agent".

(Continued)

*Primary Examiner*—Rupal D Dharia
*Assistant Examiner*—Van Kim T Nguyen
(74) *Attorney, Agent, or Firm*—Finnegan, Henderson, Farabow, Garrett & Dunner, L.L.P.

(57) ABSTRACT

Systems and techniques to provide control center pages in a portal. In general, in one implementation, the technique includes enabling a user of a portal to navigate between control level pages and execution level pages without losing work performed in the execution level pages. The control level includes user-centric control center page(s) that provide the user with personal resources and serve as an anchor, or "home", page.

10 Claims, 12 Drawing Sheets

U.S. PATENT DOCUMENTS

| | | | |
|---|---|---|---|
| 6,643,661 B2* | 11/2003 | Polizzi et al. | 707/100 |
| 6,668,273 B1* | 12/2003 | Rust | 709/204 |
| 6,668,353 B1* | 12/2003 | Yurkovic | 715/205 |
| 6,697,865 B1 | 2/2004 | Howard et al. | |
| 6,820,082 B1 | 11/2004 | Cook et al. | |
| 6,871,197 B1* | 3/2005 | Johnson | 706/61 |
| 6,912,573 B2* | 6/2005 | Ohkado et al. | 709/224 |
| 6,915,482 B2* | 7/2005 | Jellum et al. | 715/511 |
| 6,950,852 B1* | 9/2005 | Kobayaghi et al. | 709/204 |
| 6,959,268 B1 | 10/2005 | Myers, Jr. et al. | |
| 7,003,546 B1 | 2/2006 | Cheah | |
| 7,003,550 B1* | 2/2006 | Cleasby et al. | 709/205 |
| 7,054,923 B2* | 5/2006 | Krishnamoorthy | 709/219 |
| 7,124,355 B1* | 10/2006 | Kukkal | 715/501.1 |
| 7,139,978 B2* | 11/2006 | Rojewski et al. | 715/744 |
| 7,222,369 B2* | 5/2007 | Vering et al. | 726/28 |
| 7,277,924 B1* | 10/2007 | Wichmann et al. | 709/217 |
| 7,283,951 B2 | 10/2007 | Marchisio et al. | |
| 7,340,679 B2* | 3/2008 | Botscheck et al. | 715/738 |
| 7,392,254 B1 | 6/2008 | Jenkins | |
| 7,424,438 B2 | 9/2008 | Vianello | |
| 7,448,046 B2 | 11/2008 | Navani et al. | |
| 7,711,694 B2 | 5/2010 | Moore | |
| 2001/0047276 A1 | 11/2001 | Eisenhart | |
| 2001/0047293 A1 | 11/2001 | Waller et al. | |
| 2002/0049749 A1 | 4/2002 | Helgeson et al. | |
| 2002/0052894 A1 | 5/2002 | Bourdoncle et al. | |
| 2002/0059379 A1 | 5/2002 | Harvey et al. | |
| 2002/0073114 A1 | 6/2002 | Nicastro et al. | |
| 2002/0087600 A1 | 7/2002 | Newbold | |
| 2002/0111787 A1 | 8/2002 | Knyphausen et al. | |
| 2003/0023662 A1 | 1/2003 | Yaung | |
| 2003/0023677 A1 | 1/2003 | Morison Zuill et al. | |
| 2003/0046401 A1 | 3/2003 | Abbott et al. | |
| 2003/0078830 A1* | 4/2003 | Wagner et al. | 705/10 |
| 2003/0135481 A1 | 7/2003 | Helmes et al. | |
| 2003/0135559 A1 | 7/2003 | Bellotti et al. | |
| 2003/0144868 A1 | 7/2003 | MacIntyre et al. | |
| 2003/0154180 A1 | 8/2003 | Case et al. | |
| 2004/0088315 A1 | 5/2004 | Elder et al. | |
| 2004/0098467 A1* | 5/2004 | Dewey et al. | 709/219 |
| 2004/0119738 A1 | 6/2004 | Beringer et al. | |
| 2004/0119752 A1 | 6/2004 | Beringer et al. | |
| 2004/0122693 A1 | 6/2004 | Hatscher et al. | |
| 2004/0122696 A1 | 6/2004 | Beringer | |
| 2004/0122853 A1 | 6/2004 | Moore | |
| 2004/0128156 A1 | 7/2004 | Beringer et al. | |
| 2004/0131050 A1 | 7/2004 | Beringer et al. | |
| 2004/0133413 A1 | 7/2004 | Beringer et al. | |
| 2005/0086204 A1 | 4/2005 | Coiera et al. | |

OTHER PUBLICATIONS

U.S. Appl. No. 10/655,783, filed Sep. 5, 2003, entitled "Community Builder".
U.S. Appl. No. 10/657,748, filed Sep. 8, 2003, entitled "Guided Procedure Framework".
U.S. Appl. No. 10/658,584, filed Sep. 8, 2003, entitled "Resource Finder Tool".
U.S. Appl. No. 10/663,343, filed Sep. 15, 2003, entitled "Collaborative Information Spaces".
U.S. Appl. No. 10/663,365, filed Sep. 15, 2003, entitled "Resource Templates".
U.S. Appl. No. 10/663,372, filed Sep. 15, 2003, entitled "Compiling User Profile Information Fom Multiple Sources".
Neches et al., "Collaborative Information Space Analysis Tools," D-Lib Magazine, Oct. 1998.
Cavalcanti et al., "A Logic Based Approach for Automatic Synthesis and Maintenance of Web Sites," SEKE 2002, ACM, Jul. 15-19, 2002.
Weinberg et al., "Computers in Radiology: MyPACS.net,: A Web-based Teaching File Authoring Tool," The American Journal of Roentgenology, Sep. 2002, Issue 179, pp. 579-582.
Schubert, P. et al., "Virtual Communities of Transaction: The Role of Personalization In Electronic Commerce," Global Networked Organizations, Twelfth International Bled Electronic Commerce Conference, Jun. 1999, Bled, Slovenia, pp. 1-12.
"OnlineHobbyist.com," Austin American Statesman, Austin, Texas, Sep. 11, 2000, p. E.1.
"SAP Customers Worldwide Exploit New Business Opportunities With Web-Based Real-Time Business Solutions," (Business Wire. New York, Dec. 8, 1998, p. 1).
PCT International Search Report for International Application No. PCT/US04/13304, mailed Mar. 10, 2005 (3 pages).
Yahoo! (pages documented from the Internet Archive from Dec. 17, 2001: http://web.archive.org/web/20011217201239/http://group.yahoo.com/; http://web.archive.org/web/2001121700856/help.yahoo.com/help/groups/ http://web.archive.org/web/20011202071303/help.yahoo.com/help/us/groups/groups-01.ht...; http://web.archive.org/web/20011202072641/help.yahoo.com/help/us/groups/groups-23.ht...; http://web.archive.org/web/200111127132338/dir.groups.yahoo.com/dir/Hobbies_Crafts/ http://web.archive.org/web/20011125123443/dir.groups.yahoo.com/dir/Hobbies_Crafts/; http://web.archive.org/web/200111125183404/groups.yahoo.com/group/pencil-sharpeners; http://web.archive.org/web/200111217203233/http://people.yahoo.com/).
"3Com Palm VII Wireless Access Now Available for the project Gateway Enterprise Project Management System," Business Editors/High-Tech Writers, Business Wire, New York, Oct. 26, 1999 (proquest) (2 pages).
"ProjectDash Drives Consistency in Communicating Project Status online Using Innovative Graphical Project Dashboard," Business Editors, Business Wire, New York, Mar. 4, 2002 (2 pages).
www.idashes.net screenshots, Jun. 2001, accessed from www.archive.org.

* cited by examiner

CONTROL CENTER PAGES

CROSS REFERENCE TO RELATED APPLICATIONS

This application claims the benefit of priority from U.S. Provisional Application entitled "User Productivity Suite", filed Dec. 23, 2002, application Ser. No. 60/436,219, and U.S. Provisional Application entitled "Control Center Pages", filed May 16, 2003, Application Ser. No. 60/471,389.

BACKGROUND

The following description relates to control level pages for users of, e.g., an enterprise portal system, for example, personal resource pages that reflect the most common information needs of a user.

Users of business systems, e.g., employees of a company implementing such a system, may work in computing environments which include various tools (e.g., applications, services, and databases) and work triggers (e.g., emails, workflow items, and calendar events). Conventional business systems may model business processes from the company's point of view (organization-centric) rather than the employees' (people-centric). Employees using the system may be treated as actors that influence a business process by performing various tasks, e.g., inputting data, editing data, and creating reports. This type of computing environment (i.e., organization-centric rather than people-centric) may not provide a personalized and focused work environment for an individual user.

SUMMARY

The present application describes systems and techniques relating to a control center for users of an enterprise portal system In one aspect, a user of a portal is presented with control level page(s) and execution level pages in parallel browser sessions. The user can navigate between the two without losing work performed in the execution area. The control level pages may serve as personal resource pates, and may include work overview, personal message center, personal service, worklist, and personal information pages. The control page(s) may include messages, work triggers, trackable work objects, and links to services and objects in the execution level, e.g., a workset page.

The portal may be part of an enterprise management consolidation system including a cross functional application to provide communication between at least one of an object modeling tool, a process modeling tool, and a user interface tool.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 6 is a screen shot of a personal day page.

FIG. 7 is a screen shot of a personal message center page.

Like reference symbols in the various drawings indicate like elements.

DETAILED DESCRIPTION

The systems and techniques described here relate to control level pages for users of, e.g., an enterprise portal system.

Figure 1A:
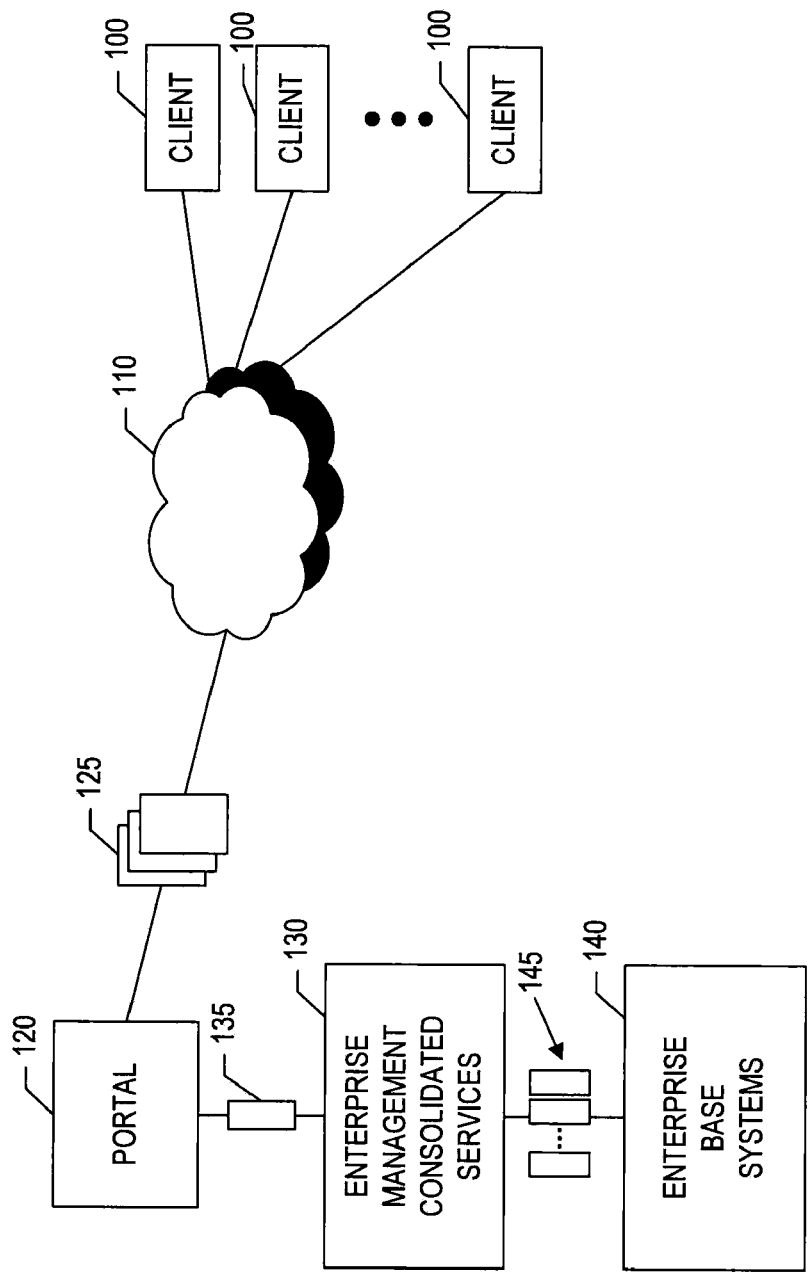
FIG. 1A shows a block diagram of an integrated enterprise management system.

FIG. 1 is a block diagram illustrating an exemplary integrated enterprise management system. Multiple clients 100 can access data over a network 110 through a portal 120. The network 110 can be any communication network linking machines capable of communicating using one or more networking protocols, e.g., a local area network (LAN), a wide area network (WAN), an enterprise network, a virtual private network (VPN), and/or the Internet. The clients 100 can be any machines or processes capable of communicating over the network 110. The clients 100 can be Web Browsers and optionally can be communicatively coupled with the network 110 through a proxy server (not shown).

A portal 120 provides a common interface to program management services. The portal 120 receives requests from the clients 100 and generates information views 125 (e.g., Web pages) in response. The portal 120 can implement a user roles-based system to personalize the common interface and the information views 125 for a user of a client 100. A user can have one or more associated roles that allow personalized tailoring of a presented interface through the generated information views 125.

The portal 120 communicates with an enterprise management system 130 that consolidates multiple application services. The portal 120 receives data 135 from the enterprise management system 130 for use in fulfilling the requests from the clients 100. The enterprise management system 130 can provide integrated application services to manage business objects and processes in a business enterprise. The business objects and processes can be resources (e.g., human resources), development projects, business programs, inventories, clients, accounts, business products, and/or business services.

The enterprise management system 130 communicates with enterprise base systems 140 to obtain multiple types of data 145. The enterprise base systems 140 can include various existing application services, such as human resource management systems, customer relationship management systems, financial management systems, project management systems, knowledge management systems, business warehouse systems, time management systems, and electronic file and/or mail systems. The enterprise base systems 140 also can include an integration tool, such as the exchange Infrastructure provided by SAP, that provides another level of integration among base systems. The enterprise management system 130 can consolidate and integrate the data and functionality of such systems into a single enterprise management tool.

This enterprise management tool can include systems and techniques to facilitate creation of new applications within the enterprise management system 130. These new applications, referred to as cross-functional or composite applications, can readily draw on the resources of the enterprise base systems 140 to cross over traditional enterprise application boundaries and handle new business scenarios in a flexible and dynamic manner, allowing rapid and continuous innovation in business process management. A virtual business cycle can be created using such cross-functional applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 130 using customized cross-functional applications. The stages can provide and consume determined services that can be integrated across multiple disparate platforms.

The portal 120, enterprise management system 130 and enterprise base systems 140 can reside in one or more programmable machines, which can communicate over a network or one or more communication busses. For example, the base systems 140 can reside in multiple servers connected to an enterprise network, and the portal 120 and the enterprise management system 130 can reside in a server connected to a public network. Thus, the system can include customized, web-based, cross-functional applications, and a user of the system can access and manage enterprise programs and resources using these customized web-based, cross-functional applications from anywhere that access to a public network is available.

The information views (e.g., Web, or portal, pages) may include control center pages, which represent generic personal resources for each user. The control center pages together form a Control Center that represents the user's personal workspace and includes highly personalized content which reflects the most common information needs of the user. The Control Center pages may facilitate control level activities, such as planning and monitoring, as opposed to execution level activities, in which work is actually performed. Consequently, the navigation framework of the Control Center may reflect the basic difference between action control phase and action execution phase.

The Control Center represents a generic UI (User Interface) framework consisting of UI elements that form a navigation structureControl Center; visual components such as views (e.g., "iViews" or "integrated views" referring to a basic unit of portal content that can be used to display information or interact with the portal user) and pages; information and application services; work artifacts such as business objects, procedures, interest profiles, and subscription rules; and collaborative elements.

Figure 1B:
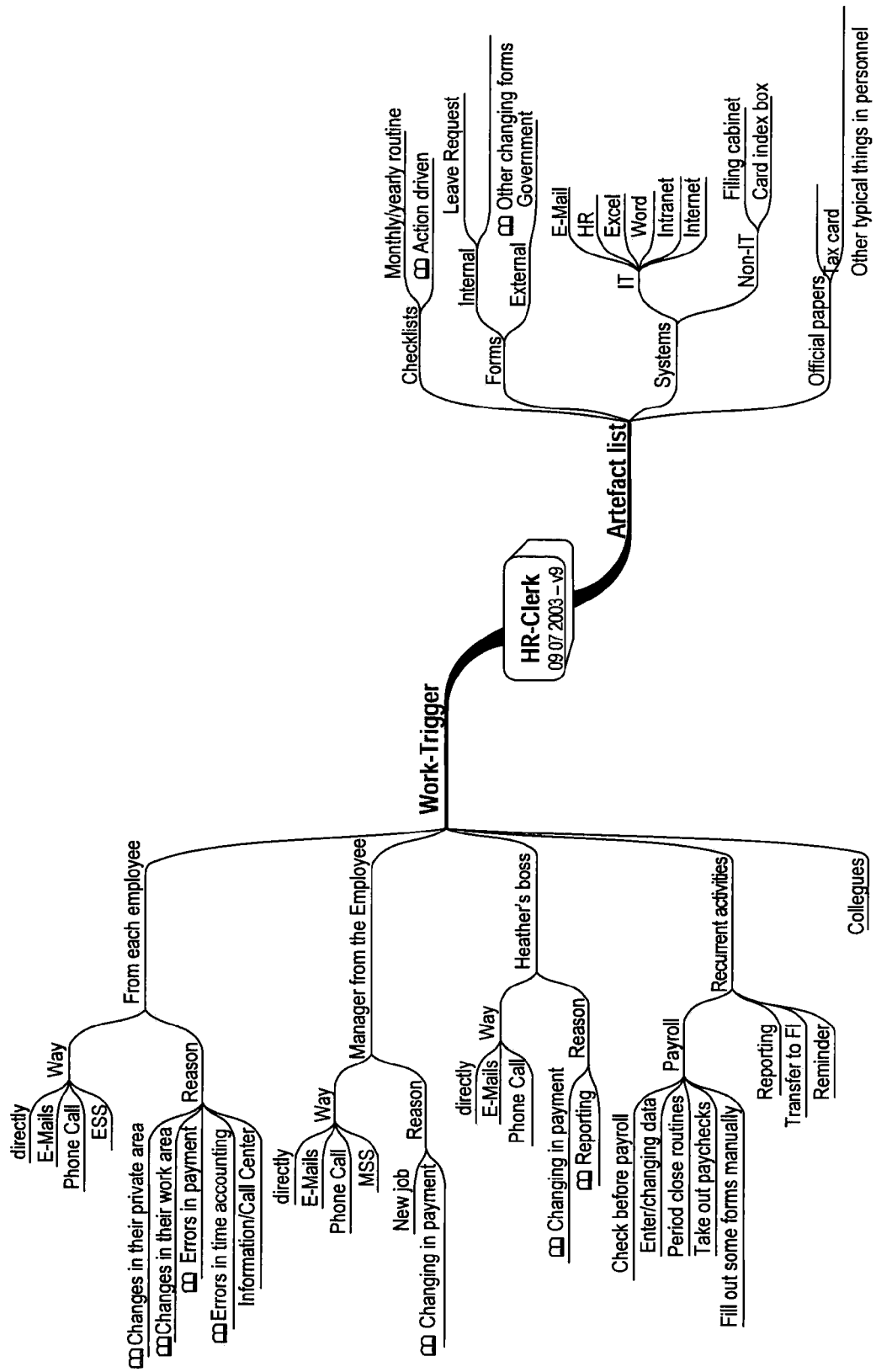
FIG. 1B is a diagram illustrating work triggers for an exemplary user.

To create a people-centric work Control Center, it is important to support generic work intents and information needs that users have when obtaining overview information about work and starting to act. FIG. 1B shows exemplary "work triggers" a user (in this case, an Human Resources (HR) clerk type) receives and the artifacts that are created in response to those work triggers. A work trigger may be an object that reflects a work item, a notification, an alert, a message, an email, or a self-reminder.

The Control Center introduces single points of access for common work control issues to effectively manage such work trigger and similar generic entities. These single points of access may include the following: preprocessing and handling incoming work triggers; getting an overview about the status of ongoing work; getting an overview about upcoming and urgent events/items; self-coordinating the user's own work; and navigating to frequently used places and tools. For each of these aspects, the Control Center provides a corresponding portal page with information unified from all active business content such as different role packages and business applications.

The Control Center may serve as an anchor, or "home", page for a corporate user. By providing such targeted information places, the Control Center may provide the user with essentially a "one-stop shopping place" for work relevant information. Also, each information place helps to structure the content unification process by introducing corresponding information classes that reflect a common aspect of the Control Center.

In an embodiment, content may be unified independently for each information class. An application registers different generic aspects of its content ("context metadata") via common APIs (Application Programming Interfaces). The information classes may include, e.g., trackable business objects, work trigger like messages, work flow, tasks, etc., time based events, and topic based events.

Figure 2A:
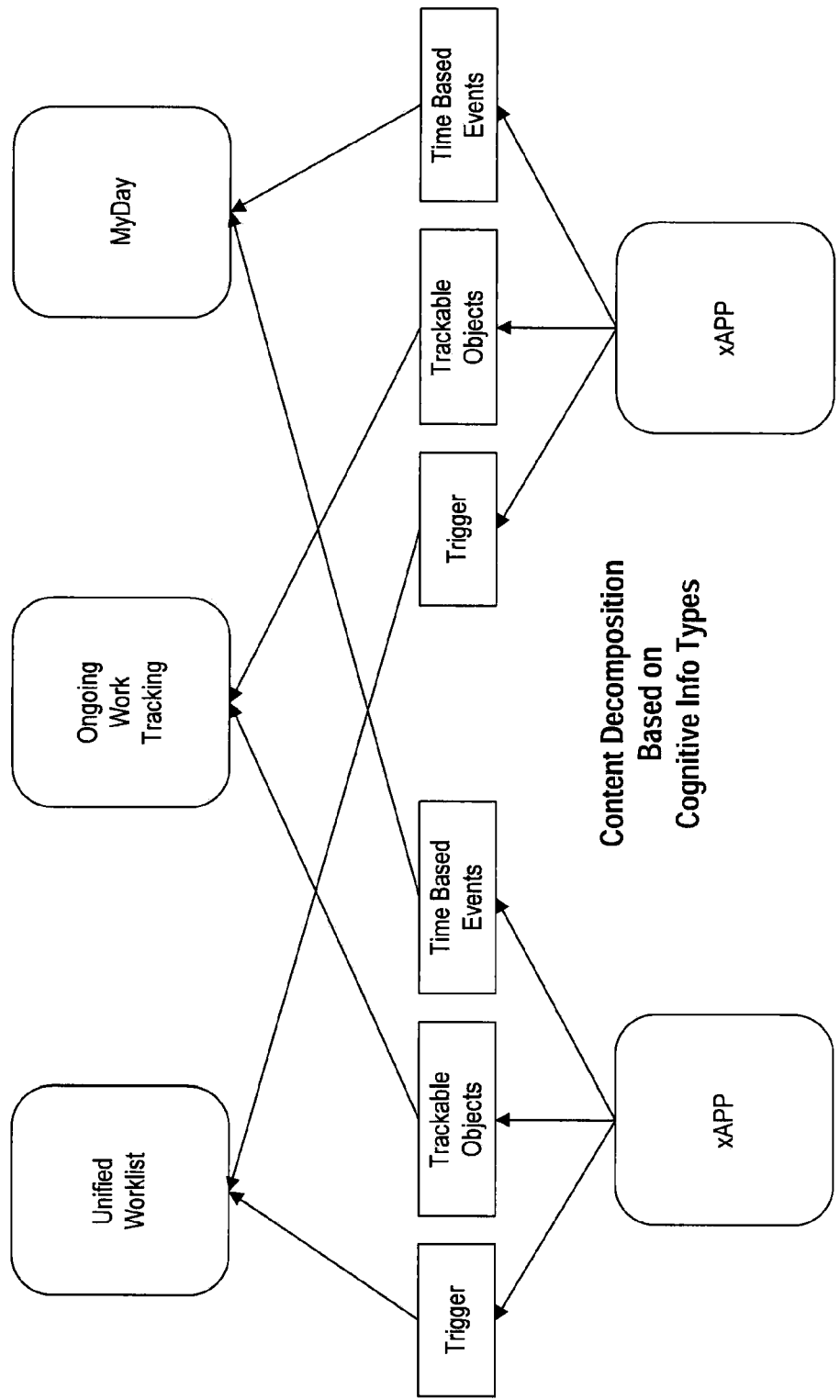
FIG. 2A illustrates a unification process performed by the Control Center.
Figure 2B:
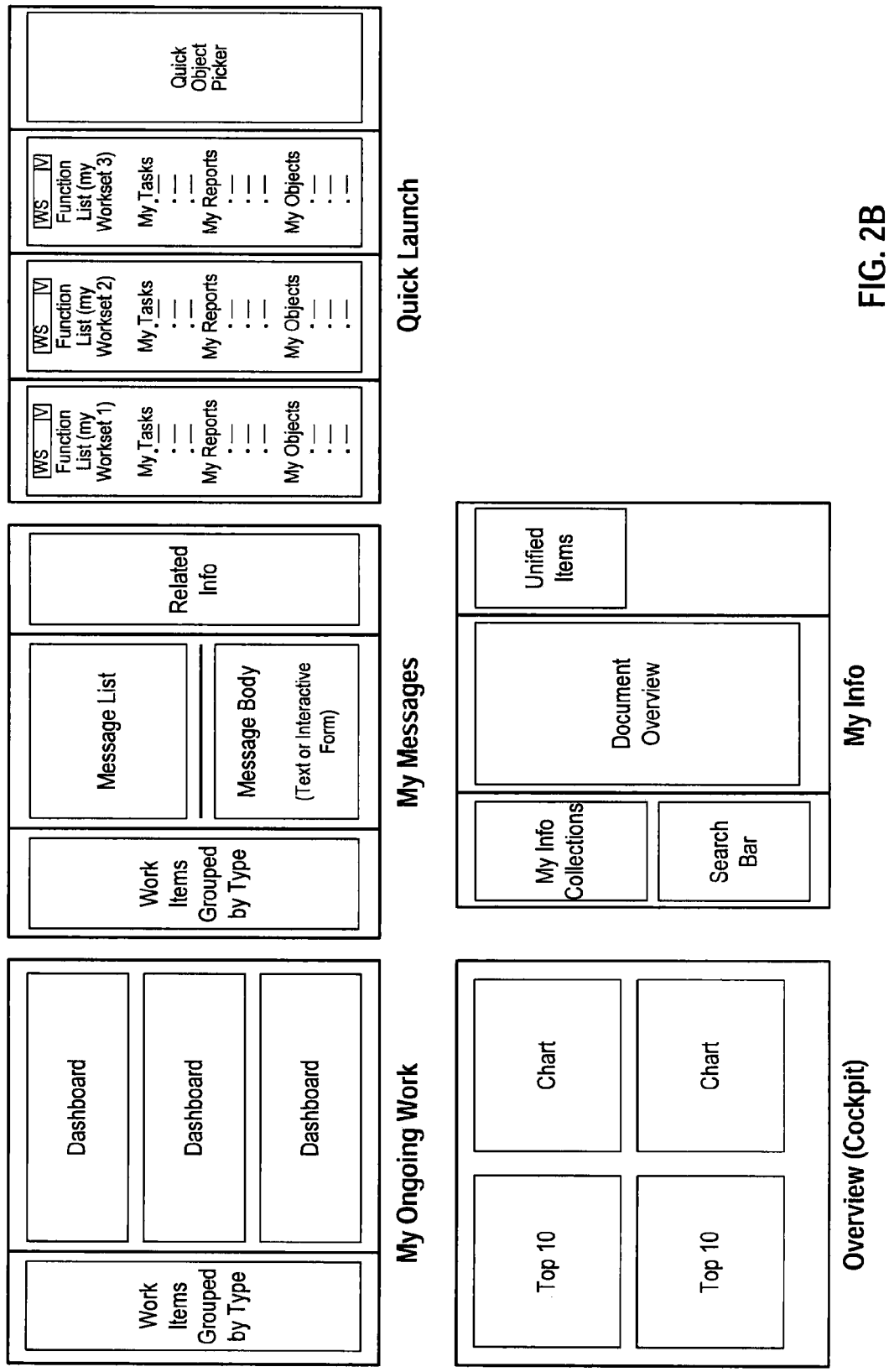
FIG. 2B shows exemplary UI (User Interface) frameworks for different Control Center pages.

The Control Center provides generic middle-ware and UI frameworks to unify the content and display it in the appropriate Control Center pages. Unlike simple front-end content unification, which has no further semantic knowledge about the UI components, this process relies on a basic assumption of generic information types that have an explicit meaning related to human work practice. As shown in FIG. 2A, the unification process may be based on a decomposition/composition algorithm. Applications expose their content by registering the information into different information classes. The Control Center pages then display such unified content within generic UI frameworks. FIG. 2B shows exemplary UI frameworks for different Control Center pages.

The system may be a workset-based portal system, which may facilitate more efficient workflow for the user. Workset-based portal systems present a user with workspaces that are targeted to the user's specific work intents and/or dominant activities, rather than providing a comprehensive list of tasks for a particular job role. In a workset-based portal system, a workspace is a portal page or part of a portal page supporting a coherent set of tasks. In an embodiment, the personal resource pages may provide front end integration from many worksets my merging selected iViews from different worksets to construct work overview pages.

A workset-based portal system is based on the recognition that a user with a particular job role performs a number of different work roles, where each work role consists of a number of tasks directed at achieving a particular work goal. For example, a sales manager (job role) may perform various different work roles related to budgeting, team leading, key account management, promotion management, and market watching. Each of the work roles involves performing one or more tasks.

In order to enable an employee such as a sales manager to perform his work roles, and thus his job role, efficiently, a workset is developed for each work role. The workset includes the tasks and corresponding portal environment for performing the particular work role, which may be bundled into one manageable data object. The workset thus reflects the user's work intent rather than stereotypical job titles, standard business objects, or business processes.

In some implementations, each workset defines a complete working environment for a given work role using a hybrid collection of elements including tools, information, communication and collaboration features, and user interface requirements. A workset may include data related to some or all of the following elements: communities (communities that associated users may want to participate in), context information (information about attributes associated with the workset; for example, attributes that users associated with the workset typically would have), description (brief description of the work intent/work goal of the workset), information/resource collection (one or more bodies of information that associated users may use as resources for achieving the work goal), name (a human-understandable name for the workset), job roles (job roles typically associated with the workset; when a job role is assigned to a particular user, he may be associated with all worksets typically associated with the job role), subscriptions (e.g., a list of resource objects the user may want to subscribe to), navigation structure (the navigation structure provided by the workset, to be combined with other navigation structures including those provided by any other assigned worksets to produce a navigation structure for the particular workset-based portal user), taxonomies (e.g. particular classifications the user may be interested in), and users (users associated with the workset; by including user data in a workset data object, notification tasks may be associated with the workset, and users associated with the workset may receive the notification).

Worksets may include meta-data that may be used for personalization of portal content for the particular user. For example, worksets may include meta-data chosen from a corporate taxonomy of interests. For example, a product support engineer may be assigned a customer feedback workset including tasks related to customer feedback for a particular customer. Meta-data associated with the workset may include an industry identifier for the particular customer chosen from the corporate taxonomy.

Users interact with worksets via one or more workspaces (e.g. portal pages or portions of portal pages) including user-interface elements. A workspace is a spatial arrangement of services and information that together support a coherent set of tasks. Each workset includes user-interface elements associated with that workset and that are displayed in the workspace for enabling tasks associated with the workset. A workspace can include a number of components, which may include iViews, for presenting content to the user. A workspace may include structured information (e.g. applications) and unstructured information, may offer social experience (e.g., users may share opinions, interact with other users via a chat function, share lessons learned, and may determine how many users have accessed particular workspaces), and may offer direct access to related actions or information.

Figure 3:
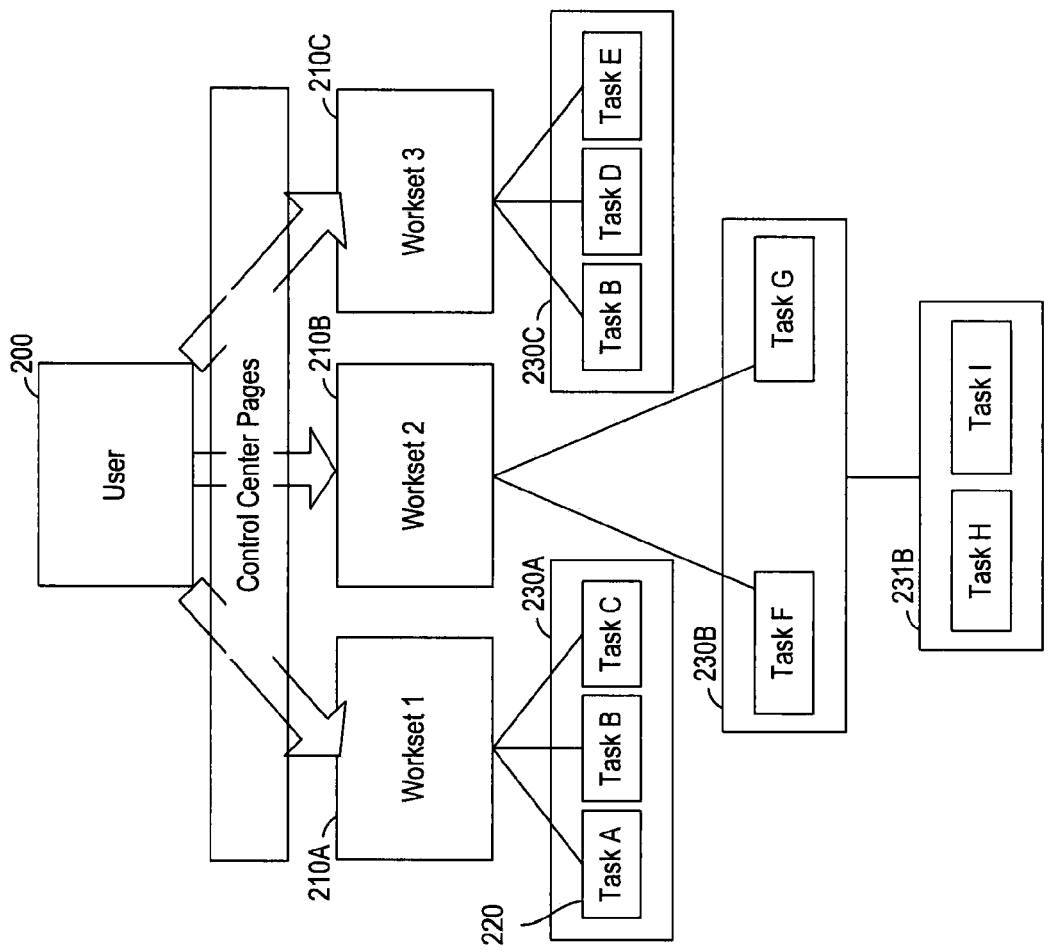
FIG. 3 is a block diagram representative of a workset.

FIG. 3 shows the relationship between a user's job role, assigned worksets, tasks, and workspaces. A user 200 has a job role which generally describes his overall work responsibilities. Typical job roles include manager, engineer, developer, sales person, administrator, etc.

Worksets 210A, 210B, and 210C are associated with three different work roles of the user. The worksets include tasks that enable the user to perform the work role. Workset 210A includes a number of tasks 220, such as tasks A, B, and C, which are presented to the user on a workspace 230A. Workset 220B includes tasks F and G, which are presented to the user on a workspace 230B. Tasks H and I may be second-level tasks associated with first-level tasks F and/or G, or may be first-level tasks presented in workspace 231B for clarity's sake. Workset 220B also includes tasks H and I, which are presented to the user on a workspace 231B. Workset 220C includes tasks B, D, and E, which are presented to the user on a workspace 230C. For example, workspace 230A may include on or more iViews on a portal page.

The Control Center may be used to unify content across worksets, e.g., by providing cross-workset views. An information level 250 including the Control Center may be proved on top of the worksets (i.e., between the user and the worksets) to support personal action planning ad monitoring across worksets and applications.

The Control Center aims to support generic user needs that originate from general cognitive action planning and control models. For each of these separable perspectives, the Control Center may provide appropriate pages that establish the user experience of a one-stop shopping place for a selected user need.. These pages may include an overview page, an ongoing work page, a personal "day" page, a personal message center page, a personal information page, a personal services page, and a quick launch page.

Figure 4:
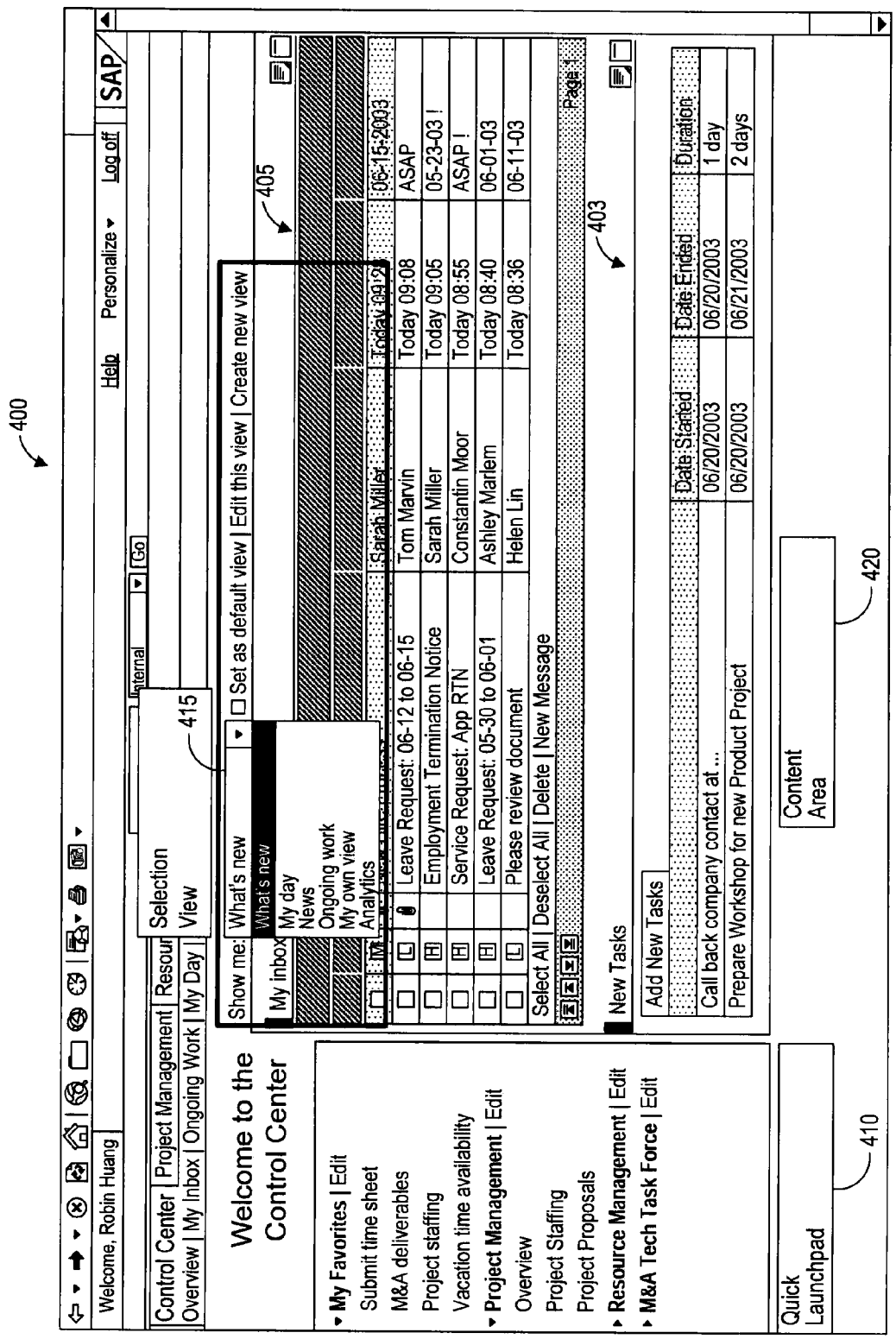
FIG. 4 is a screen shot of a generic personal overview page.

FIG. 4 shows an overview page 400. The overview page may appear when the user launches the Control Center after login. As such, its purpose is to provide the user with the most interesting information and functionality. What kind of information the user wants to see may differ significantly depending on work style and personal preferences.

The overview page may include several iViews which provide a condensed overview about relevant work information. For example, the overview page may include small-variant iViews 405, with condensed content, for, e.g., a personal inbox, new tasks, calendar, and ongoing work pages. The user may navigate to an indicated page, or large format iView, by selecting an object in a corresponding small-variant iView 305. The user may also personalize the overview page by adding and/or removing iViews in the overview page.

The overview page may include a quick launchpad 410. The quick launchpad may have a format determined by the user's role. The quick launchpad may include bullets that represent specific categories that depend from corresponding worksets. The users can use the quick launchpad to navigate to overview pages for the specific worksets and to specific content in a workset.

The user may select a type of content he/she desires an overview of in a selector view 415. The overview of the select5ed content may then be displayed in a content area 420.

Figure 5:
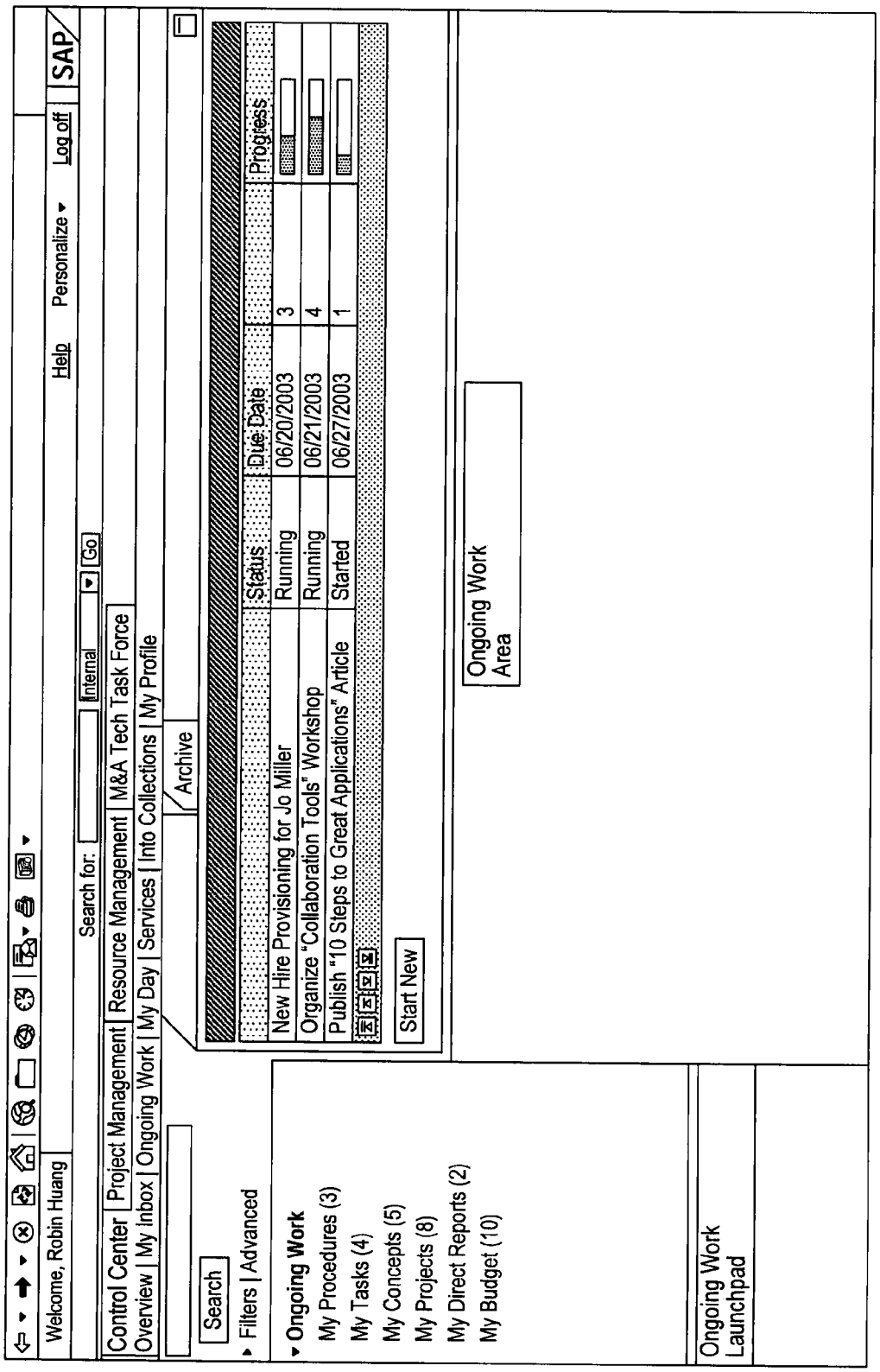
FIG. 5 is a screen shot of a personal ongoing work page.

FIG. 5 shows an ongoing work page. The ongoing work page may provide instant access to status information about ongoing work. The ongoing work page may refer to trackable work objects, which may be, e.g., a business object or guided procedure object. A guided procedure object may be created from guided procedure templates with preconfigured work procedures that reflect best practices of achieving a work objective that is part of a larger cross-functional application scenario. Such a work procedure can include contributions from several people, creation of multiple deliverables, and milestones/phases. The trackable work objects may have attributes representative of various states, e.g., not started, in progress, on hold, complete, submitted, approved.

Figure 6:
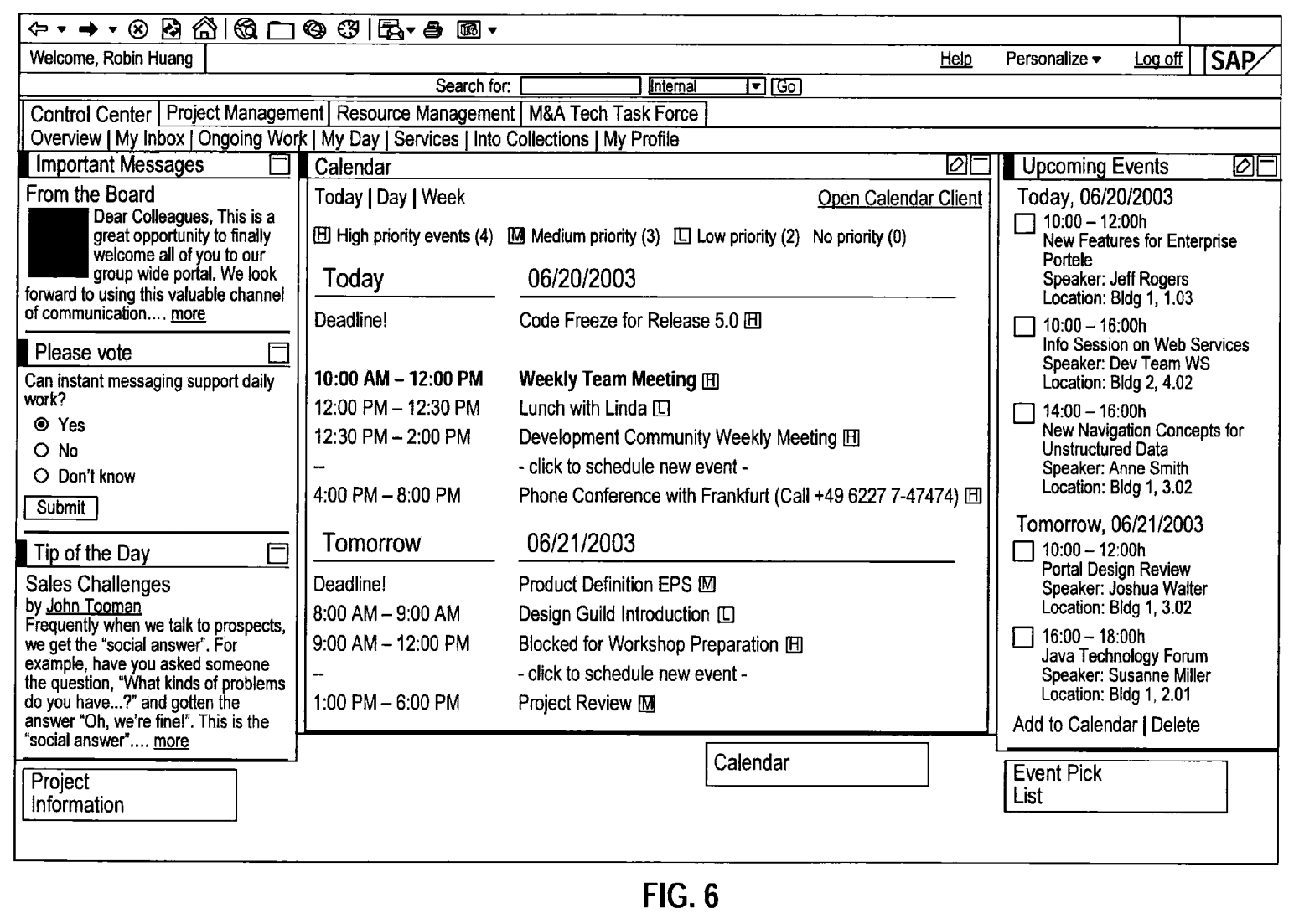

FIG. 6 shows a personal day page. The personal day page provides a quick overview about the user's day from a time-based perspective by listing today's time based events that are assigned or related to the user. This may be facilitated by a "time-based event" object class that can be used to syndicate different kinds of events such as project/submission deadlines, meetings, due dates for finishing or starting tasks, reminders, appointments, corporate events, or training sessions. The personal day page may include an iView that offers related events to a user to facilitate last minute decision making. The related event items may be assembled based on interest profile and explicit memberships in teams and projects, or for re-occurring events that have been joined previously. The personal day page may also include an iView containing urgent tasks and/or to-do list items.

Figure 7:
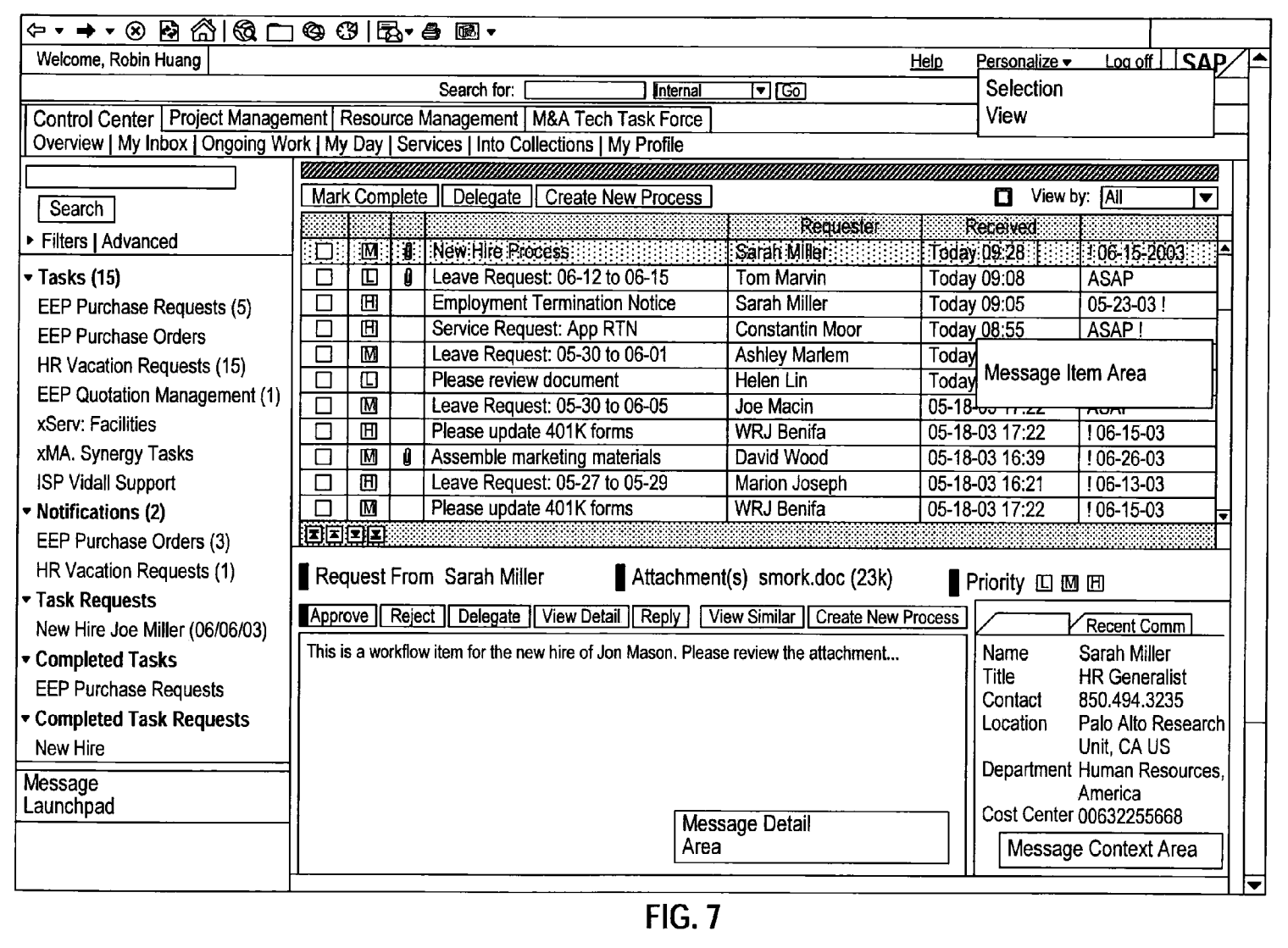

FIG. 7 shows a personal message center page. Users of knowledge sharing systems may need to send ("push") information to other users in a format that's tailored to a specific business (or social) need. The personal message center page may display all pushed messages and work triggers using a universal inbox paradigm with user selected categorical filters.

The page may include category selectors that let the user control what trigger category should be displayed. When a work trigger is selected, information related to the trigger may be displayed. The page may include an action tool bar that offers direct actions in response to a work trigger. These actions may include, e.g., the instantiation of a new guided procedure in response to a work trigger. Data from a work trigger may be populated into the procedure as required. A viewer for work trigger may depend on the trigger type, e.g., text body, interactive form, or small application (iView).

The personal message center page may be an important work place for many different types of users, including, for example, managers, purchasers, and HR generalists. The manager may use the personal message center page primarily to receive approvals, communicate with team(s), and manage tasks, whereas the purchaser may use the page to receive work items, and the HR generalist to serve employee requests.

The personal message center page may support different means for interacting with the messages and work triggers for different scenarios. In some scenarios, pre-processing may be most effective, whereas in others, sorting into the user's own work context or acting on the messages or work triggers may be more useful. Pre-processing may include, e.g., browsing messages and inspecting new work items using categories as filters. Sorting may include, e.g., prioritizing, and sorting into folders based on type, e.g., "To-Do", reminders, or urgent tasks the today. The user may act on the messages and work triggers in several ways. These may include, e.g.: sending a quick reply; delegating the item; starting a new procedure; ad-hoc clarification; navigating to source or context; monitoring pending communication(s); and archiving communication threads.

Figure 8:
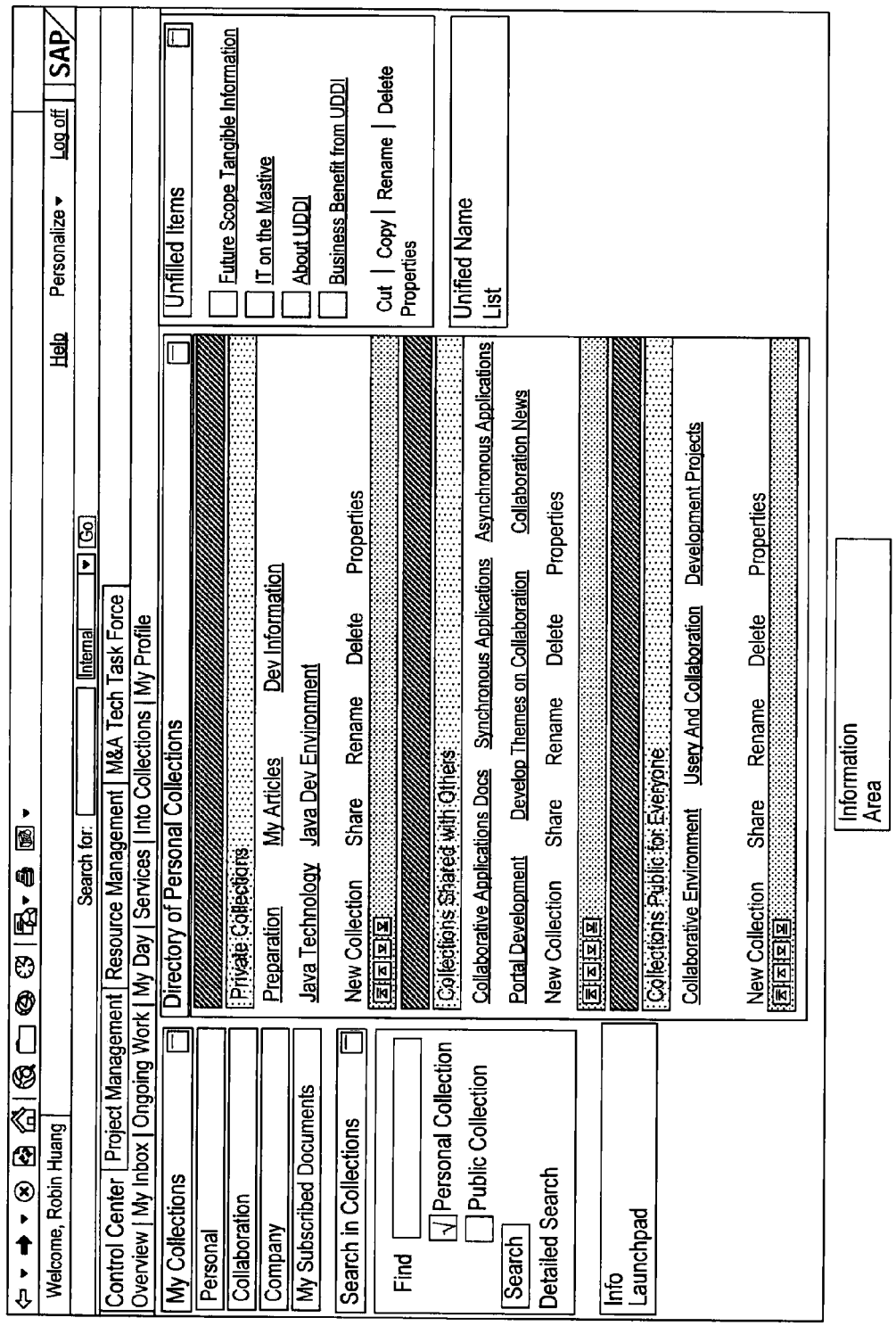
FIG. 8 is a screen shot of a personal information center page.

FIG. 8 shows a personal information page. This page may provide access to all personal information collections (e.g., documents, business objects, contacts) including those located in shared folders of teams and communities that the user is member of. This may support searching of collaborative information spaces such as team rooms, department home pages, project resource pages, and community sites. Each information collection may represent a personal or shared working context such as teams, projects, guided procedures, communities. Such collections can be hybrid and may contain everything related to a certain working context such as documents, people, and web pages. The page layout may enable quick navigation between personal contexts and shared contexts. One way this may be done is through explicit trust information spaces. These may include private personal, shared personal, team shared, and corporate shared information spaces.

Figure 9:
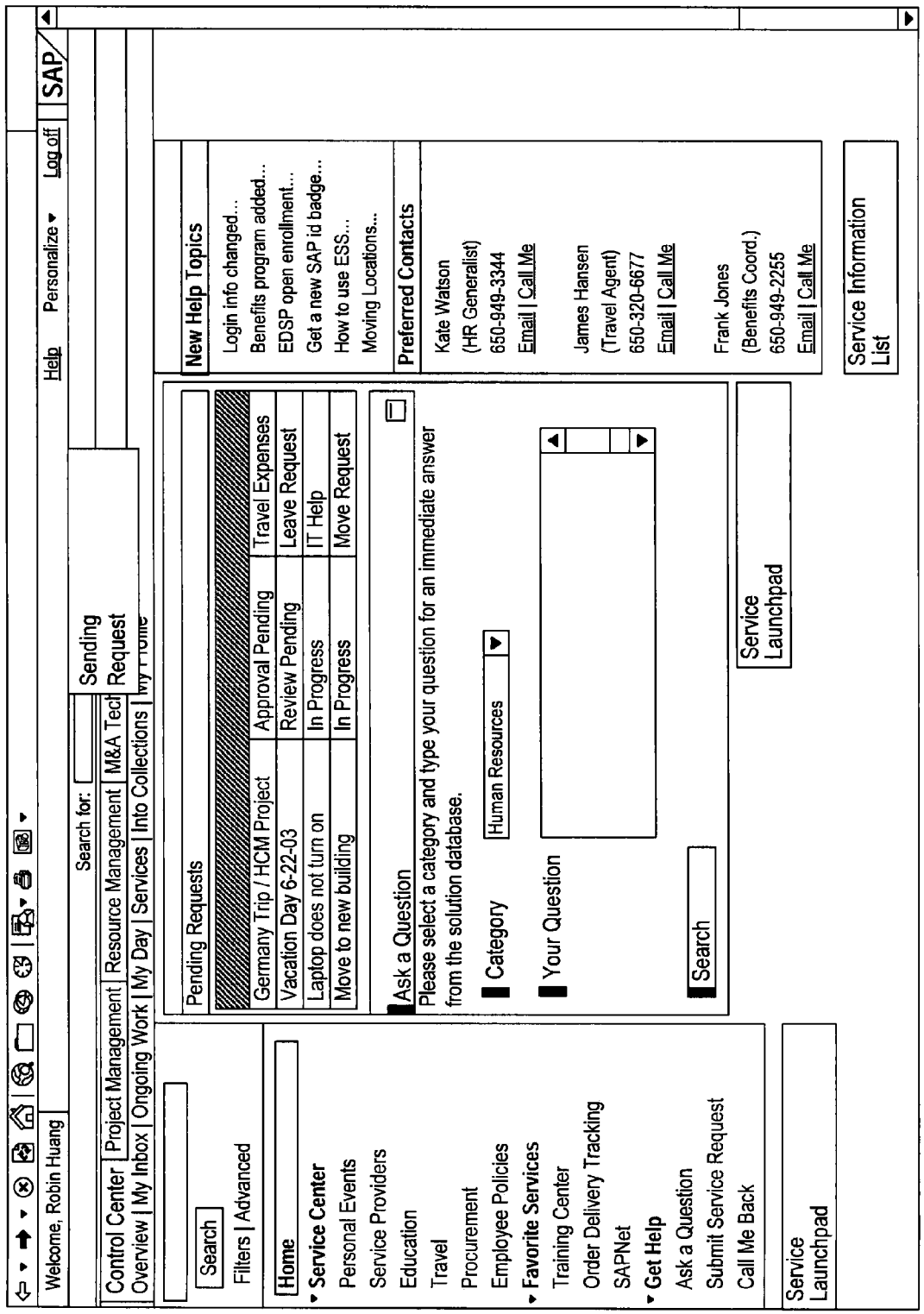
FIG. 9 is a screen shot of a personal services page.

FIG. 9 shows a personal services page. The personal services page provides access to services available to the user. The listing of available services may be created from the workset and role definitions assigned to the user. The page may be used to find, use, and track services and to contact specialists or call centers. The personal services page may include a service index with tracking of pending services and displayed announcements of service providers. The page may include category-based and personal-based service directories. Objects, e.g., radio buttons, with "help" functionality, like "Call me back", "Solution Data Base", "FAQ", may be displayed persistently in a tool bar.

Figure 10:
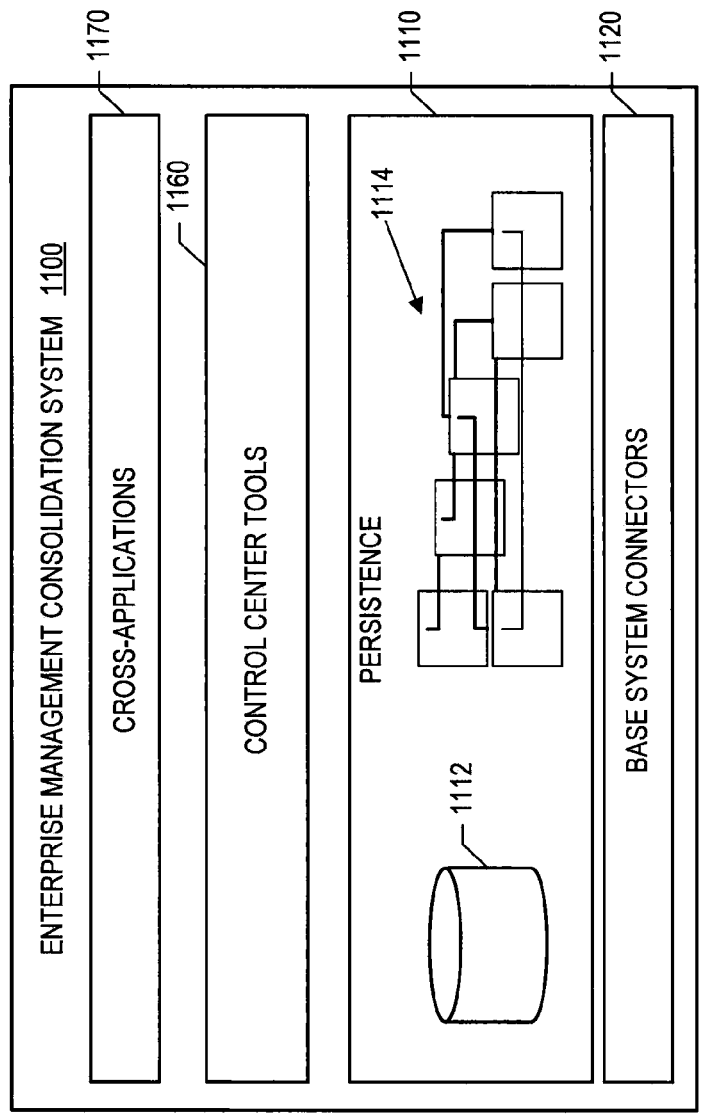
FIG. 10 is a block diagram of an enterprise management consolidation system.

FIG. 10 is a block diagram illustrating components of an exemplary enterprise management consolidation system 1100. The system 1100 can include a persistence layer 1110 and one or more base system connectors 1120. The base system connectors 1120 enable data exchange and integration with base systems. The base system connectors 1120 can include a BC (Enterprise Connector) interface, an ICM/ICF (Internet Communication Manager/Internet Communication Framework) interface, an Encapsulated PostScript® (EPS) interface, or other interfaces that provide Remote Function Call (RFC) capability.

The persistence layer 1110 provides the enterprise management consolidation system 1100 with its own database 1112 and data object model 1114. The database 1112 and the object model 1112 provide a consolidated knowledge base to support multiple enterprise management functions, including functions created as cross-applications 1170. Active communication between the persistence layer 1110 and the base systems can provide a tight linkage between real-time operational data from multiple base systems and an integrated enterprise analysis tool to allow strategic enterprise management and planning.

The data object model 1114 can represent a subset of data objects managed by the base systems. Not all of the data aspects tracked in the base systems need to be recorded in the data object model 1114. The data object model 1114 may have defined relationships with data objects stored in the base systems, for example, certain objects in the data object model 1114 may have read-only or read-write relationships with corresponding data objects in the base systems. These types of defined relationships can be enforced through the communication system built between the persistence layer 1110 and the base systems. Thus, the persistence layer 1110 can be used to effectively decouple application development from the underlying base systems.

The cross-functional applications 1170, which take advantage of this decoupling from backend systems to drive business processes across different platforms, technologies, and organizations, can be created using a set of tools, such as the Control Center, that enable efficient development of cross-functional applications 1170. The cross-functional applications 1170 can support semi-structured processes, aggregate and contextualize information, handle event-driven and knowledge-based scenarios, and support a high degree of collaboration in teams, including driving collaboration and transactions. The set of tools enable efficient development of the cross-functional applications 1170 by providing application patterns that support model-driven composition of applications in a service-oriented architecture.

The Control Center may include a set of tools 1160 provides UI patterns that can be used to link new objects and workflow together and generate standardized views into results generated by the cross-functional applications 1170. These tools may include UI frameworks, services, and object views that may be modeled around the objects to support the integration into the Control Center. The dashboard and a myOngoingWork place can be two UI patterns that are provided by the Control Center tools 1160.

Although a number of exemplary Control Center pages have been described, various other pages may be implemented. For example, whenever there is a strategic view on a cross-functional application scenario, analytics of the overall portfolio can be made available in the form of a MyAnalytics page. The MyAnalytics page may include favorite reports, cockpits, charts and other UI components that are used to monitor business processes or to represent a cross-workset report center in itself (similar to the Service Center). The MyAnalytics page may be generated by enumerating worksets and collecting reports. A view selector can be used to display/hide components, and a component can be toggled between graphical and numerical display and can include a drop-down list or menu to select sub-categories or different views. Another exemplary page is a quick launch page that provides access to all overview pages of active roles. The page can be personalized to include favorite services such as business transactions, reports, and business objects. The quick launch page may include a service index with tracking of pending services and displayed announcements of service providers.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible.

Other embodiments may be within the scope of the following claims.

What is claimed is:

1. A method comprising:
   in a portal,
   generating information views, the information views including control center pages, which represent generic personal resources for a user, the control center pages together forming a control center that represents a personal workspace of the user and including personalized content which reflects common information needs of the user and facilitates control level activities;
   presenting, in the personal workspace, a first view including at least one task associated with a first workset, wherein the first workset is associated with a first work role of the user, presenting, in the personal workspace, a second view including at least one task associated with a second workset, wherein the second workset is associated with that a second work role of the user,
   presenting, in the personal workspace, a third view including the at least one task associated with the first workset associated with the first work role of the user and the at least one task associated with the second workset associated with the second work role of the user;
   presenting a control level page in a first browser session, wherein the control level page includes links to services and objects in an execution level page, and wherein the services and objects correspond to the first workset;
   presenting the execution level page in a second browser session while maintaining the first browser session;
   receiving work performed on the execution level page;
   navigating to the control level page from the execution level page; and
   navigating back to the execution level page, the execution level page preserving the work performed before said navigating to the control level page.

2. The method of claim 1, wherein the control level page includes messages and work triggers.

3. The method of claim 1, wherein the control level page includes trackable work objects.

4. The method of claim 1, wherein the control level page includes a user's personal files and contacts.

5. The method of claim 1, wherein the control level page includes links to one or more workset areas.

6. A computer system comprising:
   a processor; and
   a cross functional application to provide communication between at least one of an object modeling tool, a process modeling tool, and a user interface tool, wherein the user interface tool is configured to:
   in a portal,
   generate information views, the information views including control center pages, which represent generic personal resources for a user, the control center pages together forming a control center that represents a personal workspace of the user and including personalized content which reflects common information needs of the user and facilitates control level activities;

present, in the personal workspace, a first view including at least one task associated with a first workset, wherein the first workset is associated with a first work role of the user;

present, in the personal workspace, a second view including at least one task associated with a second workset, wherein the second workset is associated with that a second work role of the user;

present, in the personal workspace, a third view including the at least one task associated with the first workset associated with the first work role of the user and the at least one task associated with the second workset associated with the second work role of the user;

present a control level page in a first browser session, wherein the control level page includes links to services and objects in an execution level page, and wherein the services and objects correspond to the first workset; and present the execution level page in a second browser session while maintaining the first browser session;

receive work performed on the execution level page;

navigate to the control level page from the execution level page; and navigate back to the execution level page, the execution level page preserving the work performed before said navigating to the control level page.

7. The system of claim 6, wherein the control level page includes messages and work triggers.

8. The system of claim 6, wherein the control level page includes trackable work objects.

9. The system of claim 6, wherein the control level page includes a user's personal files and contacts.

10. The system of claim 6, wherein the control level page includes links to one or more workset areas.

* * * * *